US011840297B2

(12) United States Patent
Youn et al.

(10) Patent No.: US 11,840,297 B2
(45) Date of Patent: Dec. 12, 2023

(54) PARALLEL CELL BASED MOBILITY PRODUCTION SYSTEM

(71) Applicants: Hyundai Motor Company, Seoul (KR); Kia Corporation, Seoul (KR)

(72) Inventors: Suk Jae Youn, Yongin-si (KR); Won Jin Jung, Gunpo-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 201 days.

(21) Appl. No.: 17/450,901

(22) Filed: Oct. 14, 2021

(65) Prior Publication Data

US 2022/0227441 A1 Jul. 21, 2022

(30) Foreign Application Priority Data

Jan. 21, 2021 (KR) ........................ 10-2021-0008683

(51) Int. Cl.
B62D 65/04 (2006.01)
B62D 65/06 (2006.01)
(Continued)

(52) U.S. Cl.
CPC ............ B62D 65/04 (2013.01); B23P 21/004 (2013.01); B62D 65/06 (2013.01); B62D 65/10 (2013.01);
(Continued)

(58) Field of Classification Search
CPC ........ B62D 65/04; B62D 65/06; B62D 65/10; B62D 65/12; B62D 65/14; B62D 65/16; B62D 65/00; B62D 65/02; B62D 63/025; B23P 21/004; B60Y 2304/07; G05B 2219/31054; G05B 2219/32085;
(Continued)

(56) References Cited

U.S. PATENT DOCUMENTS 5,239,739 A * 8/1993 Akeel .................... B62D 65/02
29/430
5,272,805 A * 12/1993 Akeel ............... G05B 19/41805
29/771
(Continued)

FOREIGN PATENT DOCUMENTS

GB 2373767 A 10/2002
JP 2003267278 A * 9/2003
(Continued)

OTHER PUBLICATIONS

Hottenrott et al.; Flexible layouts for the mixed-model assembly of heterogenous vehicles; May 13, 2019; OR Spectrum, Springer Berlin Heidelberg, vol. 41; No. 4, pp. 943-979 (Year: 2019).*
(Continued)

*Primary Examiner* — Bayan Salone
(74) *Attorney, Agent, or Firm* — Slater Matsil, LLP

(57) ABSTRACT

An embodiment parallel cell based mobility production system includes a front serial production line which is composed of one or more cells arranged in series and through which vehicles of various types sequentially pass to be processed, a parallel production line provided with a plurality of cells arranged in a matrix form, and a rear serial production line in which the vehicles of various types passed through the parallel production line are sequentially fed.

19 Claims, 4 Drawing Sheets

(51) Int. Cl.
  *B62D 65/10* (2006.01)
  *B62D 65/12* (2006.01)
  *B62D 65/14* (2006.01)
  *B62D 65/16* (2006.01)
  *B23P 21/00* (2006.01)

(52) U.S. Cl.
  CPC ............. *B62D 65/12* (2013.01); *B62D 65/14* (2013.01); *B62D 65/16* (2013.01)

(58) Field of Classification Search
  CPC .... G05B 2219/32395; G05B 19/41805; G05B 19/41845
  See application file for complete search history.

(56) References Cited

U.S. PATENT DOCUMENTS

| | | | | |
|---|---|---|---|---|
| 6,324,749 | B1 * | 12/2001 | Katsuura | B23P 21/004 29/430 |
| 7,306,088 | B2 * | 12/2007 | Fenzl | B23P 21/004 198/346.2 |
| 8,229,586 | B2 | 7/2012 | Wallace et al. | |
| 8,620,467 | B2 * | 12/2013 | Wallace | B23P 21/002 700/20 |
| 10,065,694 | B1 * | 9/2018 | Rompage | B62D 25/06 |
| 2002/0152615 | A1 * | 10/2002 | Kurihara | B23P 21/004 29/897 |
| 2003/0101578 | A1 | 6/2003 | Moriya et al. | |
| 2003/0208893 | A1 | 11/2003 | Kilibarda et al. | |
| 2005/0087426 | A1 | 4/2005 | Fenzl et al. | |
| 2005/0198804 | A1 | 9/2005 | Koren | |
| 2009/0000103 | A1 | 1/2009 | Muhlenkamp et al. | |
| 2013/0158696 | A1 * | 6/2013 | Wallace | B23P 19/001 700/112 |
| 2016/0325611 | A1 | 11/2016 | Kim et al. | |
| 2018/0354083 | A1 | 12/2018 | Thorwarth | |
| 2019/0185085 | A1 | 6/2019 | Toeniskoetter et al. | |
| 2020/0130115 | A1 | 4/2020 | Vetter et al. | |

FOREIGN PATENT DOCUMENTS

| | | | |
|---|---|---|---|
| JP | 2003267278 A | | 9/2003 |
| JP | 3547118 B2 | | 4/2004 |
| KR | 20190049107 A | * | 2/2019 |
| KR | 20190049107 A | | 5/2019 |
| WO | 0147661 A1 | | 7/2001 |
| WO | 2012169321 A1 | | 12/2012 |

OTHER PUBLICATIONS

Hottenrott, Andreas et al., "Flexible layouts for mixed-model assembly of heterogeneous vehicles", OR Spectrum, 11:943-979, https://doi.org/10.1007/s00291-019-00556-x, Regular Article, May 13, 2019, 37 pages.

* cited by examiner

PARALLEL CELL BASED MOBILITY PRODUCTION SYSTEM

CROSS-REFERENCE TO RELATED APPLICATIONS

The present application claims priority to Korean Patent Application No. 10-2021-0008683, filed Jan. 21, 2021, the entire contents of which is hereby incorporated herein for all purposes by this reference.

TECHNICAL FIELD

Embodiments generally relate to a parallel cell based mobility production system and a vehicle production method for preparing for the future.

BACKGROUND

Conventionally, a mass production method of certain kinds of small items has been operated centering on conveyors. However, in the future society to come, industry changes are progressing around electric vehicles, and it is expected that a change in customer-centric manufacturing methods is required to respond to customer needs where diversity is emphasized.

In conventional production line, vehicles are supplied according to a consistent sequence, and manufacturing process is performed in a consistent sequence until a finished vehicle is released. The working hours of all processes are the same, and vehicles with parts exceeding the working hours are difficult to be supplied or result in limitations in production. In other words, it is believed that there will be difficulties in responding to various customer needs in the future society while maintaining a manufacturing structure that allows only mass production of certain small items.

Therefore, it is necessary to break away from the traditional vehicle manufacturing method and to innovate a manufacturing method that can easily and quickly produce a variety of vehicles at one point.

The matters described as the background art are only for enhancing an understanding of the background of the present invention, and should not be taken as acknowledging that they correspond to the prior art already known to those of ordinary skill in the art.

SUMMARY

Embodiments are proposed to solve the problems and provides a parallel cell based mobility production system capable of responding to various customer needs by producing vehicles of various types together when producing vehicles, continuing productions and increasing production without shutdown or separate construction even in the event of an abnormal situation during the process, securing flexibility by setting the operation of each cell individually, rapidly changing production facilities according to rapid changes in product cycles, and installing and operating in factories inside buildings in downtown rather than outside factories.

In order to achieve the object above, an embodiment parallel cell based mobility production system is the parallel cell based mobility production system for producing vehicles of various types with one production system including a front serial production line which is composed of one or more cells arranged in series, and through which vehicles of various types sequentially pass to be processed, a parallel production line which is provided with a plurality of cells arranged in a matrix form, and forms sublines of various combinations to be matched for each type of the vehicle as the vehicle moves from a front to a rear and is fed to a selected cell, and a rear serial production line in which the vehicles of various types passing through the parallel production line are sequentially fed.

The front serial production line may perform a pre-task and a chassis installation process.

The front serial production line may be composed of a plurality of cells arranged in series, and each cell may perform a pre-task and a chassis installation process in sequence.

The front serial production line may be composed of sequentially arranged pre-task cell, roof installation cell, indoor and outdoor trim task cell, chassis alignment task cell, drive module installation cell, and chassis mounting cell, and vehicles of various types may sequentially pass through each cell and be processed.

Each cell of the parallel production line may be a cell that selectively performs various tasks.

Each cell of the parallel production line may perform one or more of indoor trim installation, console installation, air conditioning duct installation, and floor carpet installation in various way.

The indoor and outdoor trim task cell may be composed of sequentially arranged first cell, second cell, and third cell, and the first cell may perform one or more of vehicle wiring installation and seat belt installation.

The indoor and outdoor trim task cell may be composed of sequentially arranged first cell, second cell, and third cell, and the second cell may perform one or more of crash pad installation and floor carpet installation.

The indoor and outdoor trim task cell may be composed of sequentially arranged first cell, second cell, and third cell, and the third cell may perform one or more of headlining installation and washer liquid reservoir installation.

In the rear serial production line, an optional part mounting cell, a wheel mounting cell, a bumper mounting cell, and a door mounting cell may be arranged in series.

The optional part mounting cell may perform one or more of sheet installation, glass installation, and FEM installation.

The bumper mounting cell may perform one or more of bumper installation, pedal installation, and wiper installation.

The wheel mounting cell may perform one or more of wheel installation, tire installation, and undercover installation.

The door mounting cell may perform one or more of door installation and weather strip installation.

The parallel production line and the rear serial production line may be provided on a side of the front serial production line.

The rear serial production line may be arranged below the parallel production line, an extended area may be set between the parallel production line and the rear serial production line, and another parallel production line or another rear serial production line may be added to the extended area.

According to an embodiment parallel cell based mobility production system, it is possible to respond to various customer needs by producing vehicles of various types together when producing vehicles, to continue productions and increase production without shutdown or separate construction even in the event of an abnormal situation during the process, to secure flexibility by setting the operation of each cell individually, to rapidly change production facilities according to rapid changes in product cycles, and to install and operate in factories inside buildings in downtown rather than outside factories.

DETAILED DESCRIPTION OF ILLUSTRATIVE EMBODIMENTS

Embodiments are related to a parallel cell based mobility production system capable of responding to various customer needs by producing vehicles of various types together when producing vehicles, continuing productions and increasing production without shutdown or separate construction even in the event of an abnormal situation during the process, securing flexibility by setting the operation of each cell individually, rapidly changing production facilities according to rapid changes in product cycles, and installing and operating in factories inside buildings in downtown rather than outside factories.

Figure 1:
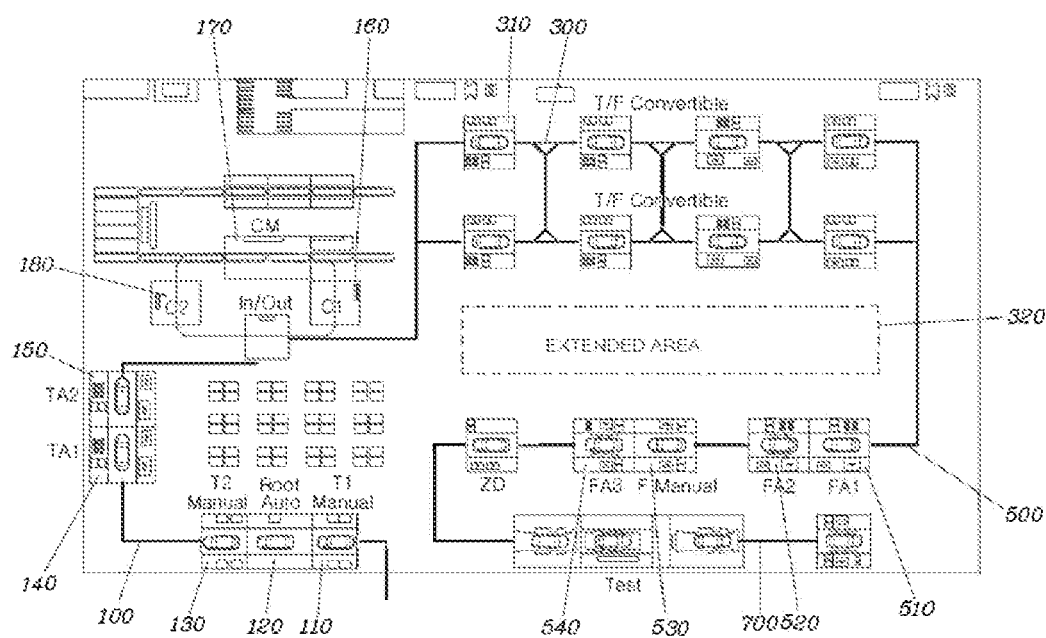
FIG. 1 is a configuration diagram of a parallel cell based mobility production system according to an embodiment.
Figure 2:
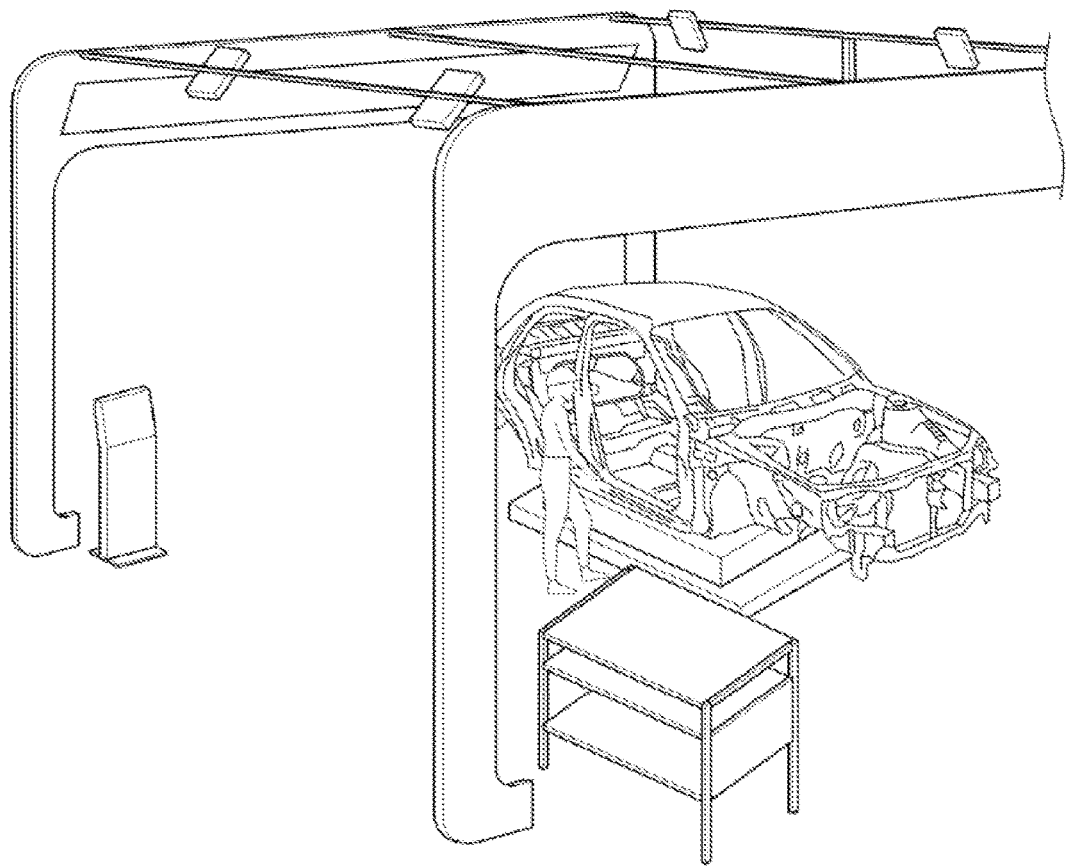
FIG. 2 is a diagram showing a passive cell of a parallel cell based mobility production system according to an embodiment.
Figure 3:
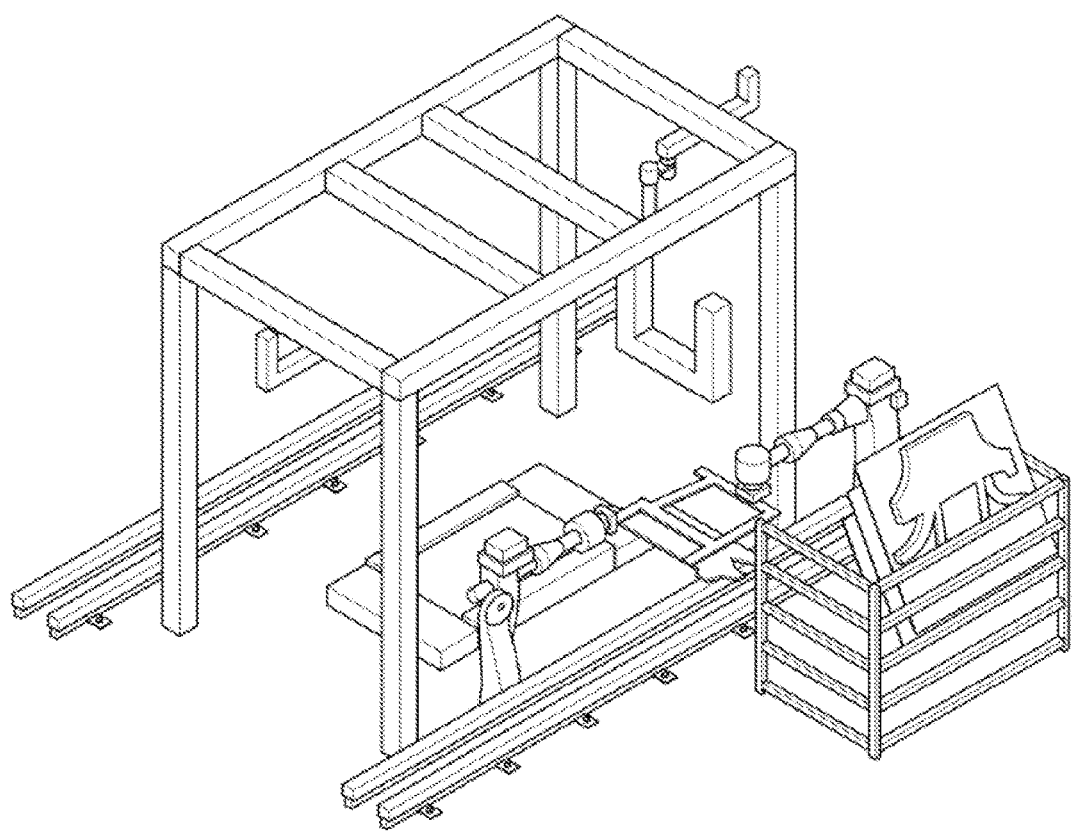
FIG. 3 is a diagram showing an automatic cell of a parallel cell based mobility production system according to an embodiment.
Figure 4:
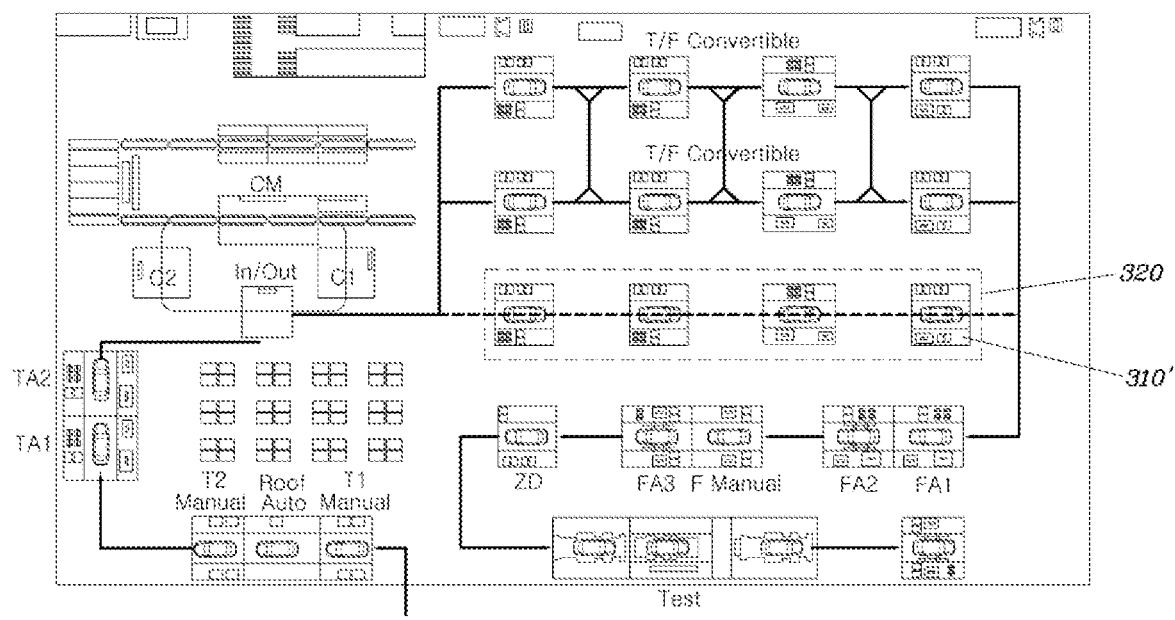
FIG. 4 is a diagram showing an operation method of a parallel cell based mobility production system according to an embodiment.

FIG. 1 is a configuration diagram of a parallel cell based mobility production system according to an embodiment, FIG. 2 is a diagram showing a passive cell of a parallel cell based mobility production system according to an embodiment, FIG. 3 is a diagram showing an automatic cell of a parallel cell based mobility production system according to an embodiment, and FIG. 4 is a diagram showing an operation method of a parallel cell-based mobility production system according to an embodiment.

FIG. 1 is a configuration diagram of a parallel cell based mobility production system according to an embodiment. The parallel cell based mobility production system according to an embodiment is a parallel cell based mobility production system capable of producing various vehicle models through a single production system. The system includes a front serial production line 100 which is composed of one or more cells arranged in series, and through which vehicles of various types sequentially pass to be processed, a parallel production line 300 which is provided with a plurality of cells arranged in a matrix form, and forms sublines of various combinations to be matched for each type of the vehicle as the vehicle moves from a front to a rear and is fed to a selected cell, and a rear serial production line 500 in which the vehicle of various types passing through the parallel production line are sequentially fed.

The vehicle production process is very complex and sequential. In the case of an embodiment, this is simplified into a front serial production line 100, a parallel production line 300, and a rear serial production line 500. In addition, the front serial production line 100 is an integrated series of common production processes, and is composed of processes in which the change in task is not large even though the vehicle types are different.

In addition, the parallel production line 300 is composed of variable cells 310 each capable of selectively performing various tasks.

Lastly, the rear serial production line 500 is a line in which the vehicles of various types that have passed through the parallel production line 300 are sequentially fed, so that a common task is sequentially performed. Finally, the vehicles pass through an inspection line 700 to perform various inspections and tests.

Specifically, an embodiment parallel cell based mobility production system is intended to enable the production of vehicles of various types in one place. When the types of vehicles to be produced are various, there may be a difference in the installation order for each vehicle type. Further, even if the same type of task is performed, there may be a difference in the amount of task. Still further, the difference in optional parts may be large between vehicles, and there may be cases where a customer has ordered a separate special order. Thus, it is difficult to correspond with the conventional conveyor production system.

To this end, an embodiment proposes a parallel cell based mobility production system capable of producing various vehicle types through one production system. First, the front serial production line 100 is composed of one or more cells arranged in series, and allows vehicles of various types to sequentially pass through so that the production operation is performed.

In addition, the parallel production line 300 is provided with a plurality of cells 310 arranged in a matrix form. Sublines of various combinations to be matched for each type of the vehicle is formed as the vehicle moves from a front to a rear and is fed to a selected cell. The embodiment shown in FIG. 1 shows a total of 16 sublines derived from a matrix combination of 2 rows and 4 columns, as an example.

In addition, the vehicles of various types that have passed through the parallel production line 300 are sequentially fed to the rear serial production line 500.

First, the front serial production line 100 may perform pre-task and chassis installation process. Specifically, the front serial production line 100 is composed of a plurality of cells arranged in series, and each cell may perform pre-task and chassis installation process sequentially.

The front serial production line 100 is composed of sequentially arranged pre-task cell 110, roof installation cell 120, indoor and outdoor trim task cell 130, 140 and 150, chassis alignment task cell 160, drive module installation cell 170, and chassis mounting cell 180, and the vehicles of various types sequentially pass through each cell so that operation may be performed.

For example, in the pre-task cell 110, a vehicle body is supplied and a pre-task process may be performed before chassis task. This may be a manual cell in which manual task is performed, and operations such as sunroof, engine room task, wiring input, etc. are performed. It is represented by T1 Manual in the drawing.

In addition, in the case of the roof installation cell 120, it is represented by Roof Auto in the drawing, and a sunroof, a roof rack, and the like may be installed.

In addition, the indoor and outdoor trim task cell 130, 140, and 150 is composed of sequentially arranged first cell, second cell, and third cell. The first cell 130 is represented by T2 Manual in the drawing, and it can perform one or more of vehicle wiring installation and seat belt installation.

The indoor and outdoor trim task cell is composed of the sequentially arranged first cell, second cell, and third cell.

The second cell 140 is represented by TA1 in the drawing, and can perform one or more of crash pad installation and carpet input.

The indoor and outdoor trim task cell is composed of the sequentially arranged first cell, second cell, and third cell. The third cell 150 is represented by TA2 in the drawing, and can perform one or more of headlining installation and washer liquid reservoir installation.

In the case of the chassis alignment task cell 160, it is represented by C1 in the drawing, and the brake tube, EPCU, alignment task before decking, etc., are performed.

In the case of the driving module installation cell 170, it is represented by CM in the drawing, and PE module and high voltage battery mounting are performed.

In the case of the chassis mounting cell 180, it is represented by C2 in the drawing, and a wheel speed sensor, a wheel guard, a brake hose, etc., are installed.

After such a series of processes are sequentially performed for all vehicles, they are respectively fed to a corresponding subline for each vehicle type.

In particular, by arranging the chassis mounting cell 180 on the front serial production line 100, a trim line can be continuously configured in the parallel production line 300, so that production flexibility can be secured.

The parallel production line 300 is composed of a plurality of cells 310, and a total of 16 sublines can be formed from various combination of the cells along the proceeding direction. Each cell can selectively perform various tasks, and specifically, one or more of indoor trim installation, console installation, air conditioning duct installation, and floor carpet installation can be variously performed.

Further, the rear serial production line 500 is arranged below the parallel production line 300, and an extended area 320 may be set between the parallel production line 300 and the rear serial production line 500.

In the rear serial production line 500, an optional part mounting cell 510, a wheel mounting cell 520, a bumper mounting cell 530, and a door mounting cell 540 may be arranged in series.

The optional part mounting cell 510 is represented by FA1 in the drawing, and can perform one or more of sheet installation, glass installation, and FEM installation.

The wheel mounting cell 520 is represented by FA2 in the drawing, and can perform one or more of wheel installation, tire installation, and undercover installation.

The bumper mounting cell 350 is represented by F Manual in the drawing, and can perform one or more of bumper installation, pedal installation, wiper installation, and wiring installation.

The door mounting cell 540 is represented by FA3 in the drawing, and a door, a weather strip, etc., are installed.

Further, the vehicles released from the rear serial production line 500 are sequentially fed to the inspection line 700 to undergo various inspections and tests.

Meanwhile, as shown in the drawings, the parallel production line 300 and the rear serial production line 500 may be provided on the side of the front serial production line 100. Further, the rear serial production line 500 is arranged below the parallel production line 300, and the extended area 320 may be set between the parallel production line 300 and the rear serial production line 500.

FIG. 4 is a diagram showing an operation method of a parallel cell based mobility production system according to an embodiment. In FIG. 4, a parallel production line is added to the extended area 320 through a new cell 310' so that additional subline is formed. By such a new route, an additional subline can be formed and production can be performed via an additional route with the fastest production flow when producing vehicles with a large amount of interior or engine room tasks.

Alternatively, if, after adding the maximum number of people to a manual process to increase production, there is difficulty in increasing production due to delay in an automatic process, it is possible to increase an automatic line and add an additional subline.

On the other hand, these cells can be divided into a manual cell in which a manual operation is performed and an automatic cell in which automatic assemblies are performed by a robot. FIG. 2 shows an embodiment of the manual cell, and FIG. 3 shows an embodiment of the automatic cell.

In addition, each cell can be easily moved within a factory, so production efficiency can be increased by efficient cell relocation. If maintenance or replacement of a specific subline is required, there is an advantage that production can be continuously performed without interruption by adding an extra subline and performing maintenance.

According to an embodiment parallel cell based mobility production system, it is possible to respond to various customer needs by producing vehicles of various types together when producing vehicles. Further, it is possible to continue productions and increase production without shutdown or separate construction even in the event of an abnormal situation during the process. Still further, it is possible to secure flexibility by setting the operation of each cell individually. Still further, it is possible to rapidly change production facilities according to rapid changes in product cycles, and to install and operate in factories inside buildings in downtown rather than outside factories.

Although shown and described in relation to specific embodiments of the present invention, it will be obvious to a person of ordinary knowledge in the art that the present invention can be variously improved and changed within the scope of the technical spirit of the present invention provided by the following claims.

What is claimed is:

1. A parallel cell based mobility production system for producing vehicles of various types with one production system, comprising:
    a front serial production line composed of one or more cells arranged in series, and through which the vehicles of various types sequentially pass to be processed;
    a parallel production line provided with a plurality of cells arranged in a matrix form, and forms sublines of various combinations to be matched for each type of the vehicle as a vehicle moves from a front to a rear and is fed to a selected cell; and
    a rear serial production line in which the vehicles of various types passing through the parallel production line are sequentially fed;
    wherein the rear serial production line is arranged below the parallel production line, an extended area is set between the parallel production line and the rear serial production line, and another parallel production line or another rear serial production line is added to the extended area.

2. The system according to claim 1, wherein the front serial production line performs a pre-task and a chassis installation process.

3. The system according to claim 1, wherein the front serial production line is composed of a plurality of cells arranged in series, and each cell performs a pre-task and a chassis installation process in sequence.

4. The system according to claim 1, wherein each cell of the parallel production line is a cell that selectively performs various tasks.

5. The system according to claim 1, wherein each cell of the parallel production line performs one or more of indoor trim installation, console installation, air conditioning duct installation, or floor carpet installation in various ways.

6. The system according to claim 1, wherein the front serial production line is composed of sequentially arranged pre-task cell, roof installation cell, indoor and outdoor trim task cell, chassis alignment task cell, drive module installation cell, and chassis mounting cell, and the vehicles of various types sequentially pass through each cell and are processed.

7. The system according claim 6, wherein the indoor and outdoor trim task cell is composed of sequentially arranged first cell, second cell, and third cell, and the first cell performs one or more of vehicle wiring installation or seat belt installation.

8. The system according claim 6, wherein the indoor and outdoor trim task cell is composed of sequentially arranged first cell, second cell, and third cell, and the second cell performs one or more of crash pad installation or floor carpet installation.

9. The system according claim 6, wherein the indoor and outdoor trim task cell is composed of sequentially arranged first cell, second cell, and third cell, and the third cell performs one or more of headlining installation or washer liquid reservoir installation.

10. The system according claim 1, wherein in the rear serial production line, an optional part mounting cell, a wheel mounting cell, a bumper mounting cell, and a door mounting cell are arranged in series.

11. The system according claim 10, wherein the optional part mounting cell performs one or more of sheet installation, glass installation, or front electronic module (FEM) installation.

12. The system according claim 10, wherein the bumper mounting cell performs one or more of bumper installation, pedal installation, or wiper installation.

13. The system according claim 10, wherein the wheel mounting cell performs one or more of wheel installation, tire installation, or undercover installation.

14. The system according to claim 1, wherein the parallel production line and the rear serial production line are provided on a side of the front serial production line.

15. A parallel cell based mobility production system for producing vehicles of various types with one production system, comprising:
   a front serial production line composed of a plurality of cells arranged in series, and through which the vehicles of various types sequentially pass to be processed, wherein each cell of the front serial production line performs a pre-task and a chassis installation process in sequence;
   a parallel production line provided with a plurality of cells arranged in a matrix form, and forms sublines of various combinations to be matched for each type of the vehicle as a vehicle moves from a front to a rear and is fed to a selected cell, wherein each cell of the parallel production line is a cell that selectively performs various tasks; and
   a rear serial production line in which the vehicles of various types passing through the parallel production line are sequentially fed;
   wherein the rear serial production line is arranged below the parallel production line, an extended area is set between the parallel production line and the rear serial production line, and another parallel production line or another rear serial production line is added to the extended area.

16. The system according to claim 15, wherein the front serial production line is composed of sequentially arranged pre-task cell, roof installation cell, indoor and outdoor trim task cell, chassis alignment task cell, drive module installation cell, and chassis mounting cell, and the vehicles of various types sequentially pass through each cell and are processed.

17. The system according to claim 15, wherein each cell of the parallel production line performs one or more of indoor trim installation, console installation, air conditioning duct installation, or floor carpet installation in various ways.

18. The system according claim 15, wherein in the rear serial production line, an optional part mounting cell, a wheel mounting cell, a bumper mounting cell, and a door mounting cell are arranged in series.

19. The system according claim 15, wherein the parallel production line and the rear serial production line are provided on a side of the front serial production line.

* * * * *

UNITED STATES PATENT AND TRADEMARK OFFICE
CERTIFICATE OF CORRECTION

PATENT NO. : 11,840,297 B2  
APPLICATION NO. : 17/450901  
DATED : December 12, 2023  
INVENTOR(S) : Youn et al.

Page 1 of 1

It is certified that error appears in the above-identified patent and that said Letters Patent is hereby corrected as shown below:

On the Title Page

Item (73), in "Assignees", Line 1, delete "South" and insert -- Seoul --.

Item (73), in "Assignees", Line 2, delete "South" and insert -- Seoul --.

In the Claims

In Column 7, in Claim 7, Line 15, after "according" insert -- to --.

In Column 7, in Claim 8, Line 20, after "according" insert -- to --.

In Column 7, in Claim 9, Line 25, after "according" insert -- to --.

In Column 7, in Claim 10, Line 30, after "according" insert -- to --.

In Column 7, in Claim 11, Line 34, after "according" insert -- to --.

In Column 7, in Claim 12, Line 38, after "according" insert -- to --.

In Column 7, in Claim 13, Line 41, after "according" insert -- to --.

In Column 7, in Claim 14, Line 44, after "according" insert -- to --.

In Column 8, in Claim 18, Line 38, after "according" insert -- to --.

In Column 8, in Claim 19, Line 42, after "according" insert -- to --.

Signed and Sealed this  
Twentieth Day of February, 2024

Katherine Kelly Vidal  
*Director of the United States Patent and Trademark Office*